(12) United States Patent
Steele et al.

(10) Patent No.: US 10,072,627 B2
(45) Date of Patent: Sep. 11, 2018

(54) TORQUE TRANSFER UNIT FOR AN ENGINE STARTING SYSTEM

(71) Applicant: MAGNA POWERTRAIN INC., Concord (CA)

(72) Inventors: Sean Steele, Mississauga (CA); David Dorigo, Oakville (CA); Adrian C. Cioc, Richmond Hill (CA)

(73) Assignee: MAGNA POWERTRAIN INC., Concord (CA)

( * ) Notice: Subject to any disclaimer, the term of this patent is extended or adjusted under 35 U.S.C. 154(b) by 1163 days.

(21) Appl. No.: 14/356,203

(22) PCT Filed: Nov. 7, 2012

(86) PCT No.: PCT/IB2012/056244
§ 371 (c)(1),
(2) Date: May 5, 2014

(87) PCT Pub. No.: WO2013/068953
PCT Pub. Date: May 16, 2013

(65) Prior Publication Data
US 2014/0305396 A1    Oct. 16, 2014

Related U.S. Application Data

(60) Provisional application No. 61/556,404, filed on Nov. 7, 2011.

(51) Int. Cl.
*F02N 11/08* (2006.01)
*F16D 41/067* (2006.01)
(Continued)

(52) U.S. Cl.
CPC ........ *F02N 11/0851* (2013.01); *F02N 15/025* (2013.01); *F16D 41/067* (2013.01);
(Continued)

(58) Field of Classification Search
CPC .. F02N 11/0851; F02N 15/025; F02N 15/026; F02N 15/022; F02N 11/00; F16D 41/067; F16D 2300/08
(Continued)

(56) References Cited

U.S. PATENT DOCUMENTS 3,017,002 A    1/1962  Marland
5,819,899 A    10/1998 Iga et al.
(Continued)

FOREIGN PATENT DOCUMENTS

DE    409374 C    2/1925
EP    1717087 A1   11/2006
(Continued)

OTHER PUBLICATIONS

Extended European Search Report dated Jul. 28, 2016 in corresponding European Patent Application No. 12846857.6.

*Primary Examiner* — Hung Q Nguyen
(74) *Attorney, Agent, or Firm* — Dickinson Wright PLLC

(57) ABSTRACT

A starting system for a vehicle including an internal combustion engine having a crankshaft includes a pinion gear driven by a starter motor. A drive plate includes a set of teeth in constant meshed engagement with the pinion gear. A one-way clutch assembly is adapted to drivingly interconnect the drive plate and the crankshaft. The clutch assembly includes an inner race adapted to be fixed for rotation with the crankshaft, an outer race fixed for rotation with the drive plate, and a plurality of rollers positioned radially therebetween. One of the inner and outer races includes circumferentially spaced apart cam surfaces. The clutch assembly also includes a cage for positioning the rollers in a circumferentially spaced apart alignment with the cam surfaces and a (Continued)

roller bearing assembly positioned axially offset from the one-way clutch rollers to rotatably support the outer race on the inner race.

15 Claims, 6 Drawing Sheets

(51) Int. Cl.
*F02N 11/00* (2006.01)
*F02N 15/02* (2006.01)

(52) U.S. Cl.
CPC ............ *F02N 11/00* (2013.01); *F02N 15/022* (2013.01); *F02N 15/026* (2013.01); *F16D 2300/08* (2013.01)

(58) Field of Classification Search
USPC ..................................................... 123/179.25
See application file for complete search history.

(56) References Cited

U.S. PATENT DOCUMENTS

| 6,119,838 | A | 9/2000 | Igari et al. |
| 6,279,708 | B1 | 8/2001 | Yatabe et al. |
| 6,302,252 | B1 | 10/2001 | Iga |
| 7,093,703 | B2 | 8/2006 | Ikeda et al. |
| 7,406,768 | B2 | 8/2008 | Ikeda et al. |
| 8,943,914 | B2 * | 2/2015 | Steele ................... F02N 15/022 123/185.1 |
| 2004/0089510 | A1 * | 5/2004 | Ishizaka ................ F16D 41/066 192/45.02 |
| 2007/0034030 | A1 * | 2/2007 | Suzuki ................... F02N 15/022 74/6 |
| 2009/0008190 | A1 * | 1/2009 | Suzuki ................... F02N 15/00 184/6.3 |
| 2011/0252902 | A1 | 10/2011 | Suzuki et al. |

FOREIGN PATENT DOCUMENTS

| GB | 141732 A | 7/1921 |
| JP | H1172127 A | 3/1999 |
| JP | 2000291651 A | 10/2000 |
| JP | 2003214528 A | 7/2003 |
| WO | 2010028510 A1 | 3/2010 |
| WO | 2010028511 A1 | 3/2010 |
| WO | WO2011040293 A1 | 4/2011 |
| WO | 2011060549 A1 | 5/2011 |
| WO | 2011060550 A1 | 5/2011 |
| WO | 2011060551 A1 | 5/2011 |

* cited by examiner

TORQUE TRANSFER UNIT FOR AN ENGINE STARTING SYSTEM

CROSS-REFERENCE TO RELATED APPLICATIONS

This application is a U.S. National Phase of International Application No. PCT/IB2012/056244 filed Nov. 7, 2012 and which claims the benefit of U.S. Provisional Application No. 61/556,404, filed on Nov. 7, 2011. The entire disclosure of each of the above applications is incorporated herein by reference.

FIELD

The present disclosure generally relates to a torque transfer mechanism including an overrunning roller clutch for selectively transferring torque between two rotatable components. More particularly, a starting system for an internal combustion engine including an overrunning roller clutch is disclosed.

BACKGROUND

The statements in this section merely provide background information related to the present disclosure and may not constitute prior art.

Hybrid vehicles having an internal combustion engine as a first source of motive power and an electric motor as a second source of motive power have become increasingly popular based on fuel costs and environmental concerns. In at least one hybrid vehicle, the internal combustion engine is frequently started and stopped to most efficiently operate the vehicle. Some engine starting systems may include retractable pinion electric motors, a pinion synchronizing system, or a belt integrated starter/generator combination. These systems may not be best suited for the frequency of engine starting events associated with a hybrid vehicle. Durability, noise, vibration and harshness (NVH) concerns may exist.

To minimize and/or eliminate NVH issues associated with typical internal combustion engine starting systems, a starter motor gear may be positioned in constant meshed engagement with a rotating member of the internal combustion engine. A clutch is positioned along this power path to allow temporary driving interconnection between the starter motor and the internal combustion engine. While various clutch designs may be incorporated, cost, size, weight, lubrication requirements and torque carrying capacity concerns exist.

At least one known clutch associated with an automotive vehicle is positioned immediately adjacent to or partially within the engine block of the internal combustion engine. This positioning is required because lubricant within the engine block is provided to the clutch as well. While such an arrangement may prove to be beneficial, the positioning of the clutch in this system is limited and is not necessarily desirable. Furthermore, additional special machining may be required to the engine block or other internal combustion engine components in order to provide appropriate passageways for the lubricant to reach and return from the clutch.

Other known clutch characteristics such as the generation of heat and a loss of efficiency when operating in an overrunning mode may not lend themselves for use in a vehicle attempting to maximize energy efficiency. Additionally, some clutches suffer a degradation in performance such as binding when placed in an environment subject to dynamic movement in radial, axial and/or angular directions. As dynamic movement between rotating components increases, some designs become less robust. Internal combustion engine crankshafts may exhibit vibration and dynamic loading during engine operation that may result in torque spiking between internal working components of the clutch. An undesirable oscillatory force may be transferred to other driveline components. Accordingly, it may be desirable to provide an improved internal combustion engine starting system having a robust torque transfer mechanism.

SUMMARY

This section provides a general summary of the disclosure, and is not a comprehensive disclosure of its full scope or all of its features.

A starting system for a vehicle including an internal combustion engine having a crankshaft rotatably supported within an engine block includes a pinion gear driven by a starter motor. A drive plate includes a set of teeth in constant meshed engagement with the pinion gear. A one-way clutch assembly is adapted to drivingly interconnect the drive plate and the crankshaft. The one-way clutch assembly includes a roller clutch having an inner race adapted to be fixed for rotation with the crankshaft, an outer race fixed for rotation with the drive plate, and a plurality of rollers positioned radially therebetween. One of the inner and outer races includes circumferentially spaced apart cam surfaces. The one-way clutch assembly also includes a cage for positioning the rollers in a circumferentially spaced apart alignment with the cam surfaces and a roller bearing assembly positioned axially offset from the one-way clutch rollers to rotatably support the outer race on the inner race.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
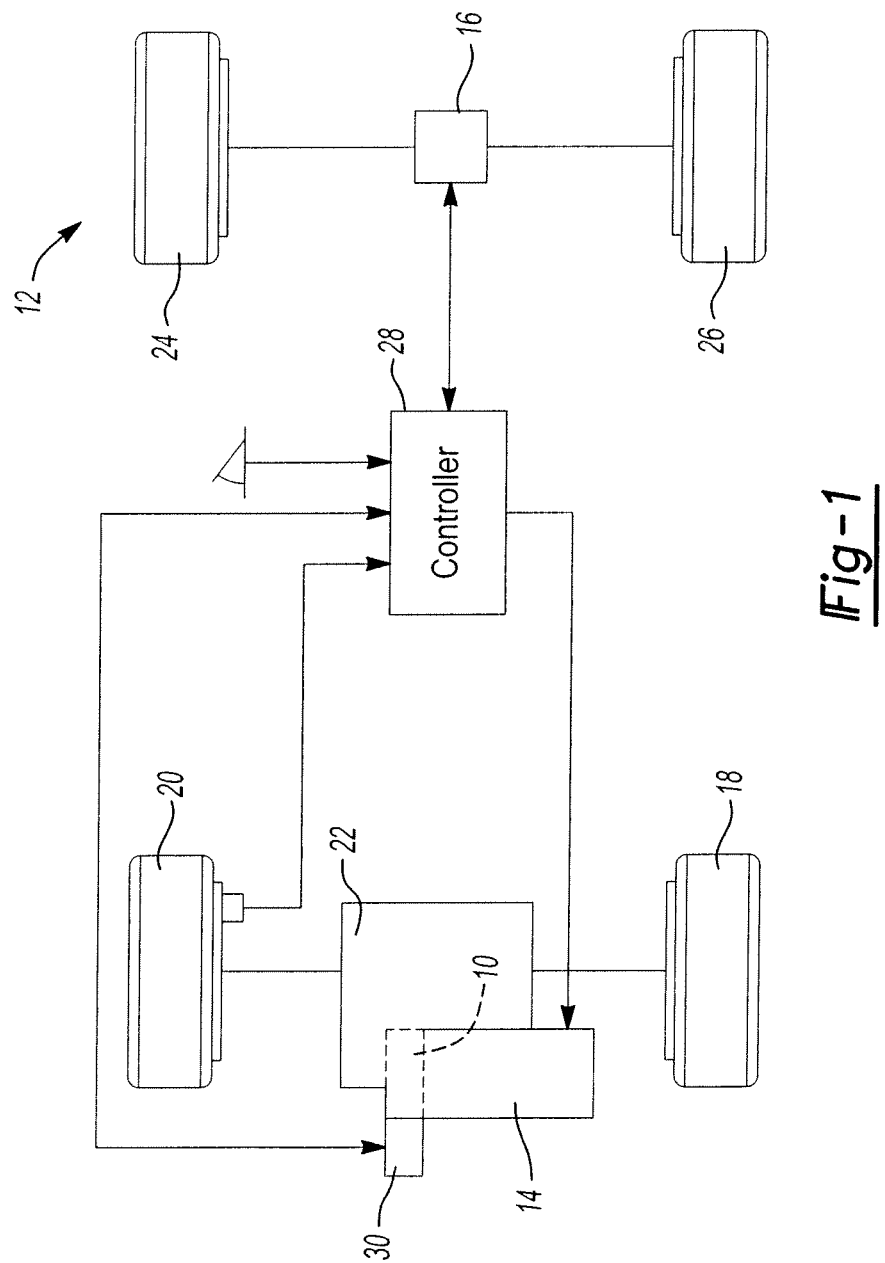
FIG. 1 is a schematic of an exemplary hybrid vehicle equipped with an engine starting system including a one-way clutch assembly constructed in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

FIGS. 1-5 depict a torque transfer system 8 including a one-way overrunning clutch 10 arranged to selectively transfer torque between rotatable components within an exemplary vehicle 12. Vehicle 12 may be configured as a hybrid vehicle having an internal combustion engine 14 as a first source of motive power. A second source of motive power is provided by an electric motor 16. The schematic of FIG. 1 depicts a pair of driven wheels 18, 20 in receipt of torque provided by internal combustion engine 14 and transferred through a transmission 22. Electric motor 16 is shown in driving communication with another pair of driven wheels 24, 26. One skilled in the art will appreciate that the number of wheels driven by internal combustion engine 14 or electric motor 16 is merely exemplary and that any number of other power transmission arrangements may be implemented including a series-hybrid drive, a parallel-hybrid drive, or a series/parallel hybrid drive. Alternatively, the vehicle equipped with overrunning clutch 10 need not be a hybrid vehicle but may be solely equipped with an internal combustion engine power source. For example, clutch 10 may be useful within a conventional vehicle having an internal combustion engine controlled for frequent starts and stops.

During operation of vehicle 12, it is contemplated that internal combustion engine 14 will frequently be stopped and re-started in an attempt to improve fuel efficiency. For example, internal combustion engine 14 may be stopped once a controller 28 determines that the vehicle speed has been below a predetermined threshold for a predetermined amount of time such as when the vehicle is idling at a stop light. Depending on a number of inputs to controller 28, such as a throttle position, vehicle 12 may be propelled solely through power provided by electric motor 16, power provided by both internal combustion engine 14 and electric motor 16 or power provided solely by internal combustion engine 14. Regardless of the control scheme utilized, engine 14 may require frequent restarting.

Torque transfer mechanism 8 includes a starter motor 30 selectively operable to transfer torque to a crankshaft 32 of engine 14 when controller 28 signals for a starting or re-starting of internal combustion engine 14. Starter motor 30 includes a pinion gear 34 in constant meshed engagement with a ring gear 36 fixed to a drive plate 38. Ring gear 36 may be formed as one-piece with drive plate 38 or may be a separate component fixed for rotation thereto. Drive plate 38 includes a central aperture 40 in receipt of a portion of clutch 10. Clutch 10 selectively transfers torque between drive plate 38 and crankshaft 32. A flex plate 42 is fixed for rotation with a torque converter 44 by a plurality of fasteners 45. Torque converter 44 is supported for rotation within transmission 22. Flex plate 42 is also fixed for rotation with crankshaft 32 as described below.

Clutch 10 is configured as a one-way overrunning roller clutch assembly which generally includes an outer race 46 fixed for rotation with drive plate 38, an inner race 48 fixed for rotation with crankshaft 32, a plurality of rollers 50, a cage 52, a multi-spring 54, a load plate 55, a bearing assembly 56, inner and outer bearing retaining rings 57, 58, a seal assembly 59, a seal plate 60 and a snap ring 61. Rollers 50, cage 52 and multi-spring 54 may be arranged as a roller and cage subassembly 63. Crankshaft 32 is supported for rotation within an engine block 62 by a plurality of bearings (not shown) for rotation about a central rotary axis.

Bearing assembly 56 includes an inner member 76, an outer member 78, and a plurality of rolling elements 80 positioned therebetween. Inner member 76 may be fixed to inner race 48 via a press-fit. Similarly, outer member 78 may be fixed to outer race 46 in a press-fit arrangement. Rolling elements 80 allow relative rotation between inner member 76 and outer member 78. One edge of inner member 76 is positioned adjacent to a seat 82 formed in the inner race 48. The opposite edge of inner member 76 is engaged by inner bearing retaining ring 57 to restrict axial movement of inner member 76 relative to inner race 48. A ring groove 84 is in receipt of inner bearing retaining ring 57. Outer member 78 is restricted from axial movement relative to outer race 46 by load plate 55 and outer bearing retaining ring 58. A ring groove 86 receives load plate 55 while another ring groove 88 is in receipt of outer bearing retaining ring 58.

Outer race 46 may be coupled to drive plate 38 in a press-fit arrangement. More particularly, drive plate 38 may be press-fit and microsplined to outer race 46. Alternatively, drive plate 38 and outer race 46 may be welded together.

An inner diameter of outer race 46 includes a first bore 91 having ring grooves 86, 88, a plurality of cam surfaces 92 and a second bore 93. Cam surfaces 92 are circumferentially spaced apart from one another with each cam surface 92 having a shallow end 94 and a deep end 95 further radially recessed into outer race 46. It should be appreciated that cam surfaces 92 may alternately be formed on an outer surface of inner race 48.

Inner race 48 includes a substantially circular cylindrical mounting flange 96 in engagement with an end face 98 of crankshaft 32. A seal 97 is positioned between inner race 48 and crankshaft 32. As previously mentioned, inner race 48 is fixed for rotation with crankshaft 32. In the arrangement depicted in FIG. 2, inner race 48 is fixed to crankshaft 32 with threaded fasteners 99. Fasteners 99 fix inner race 48 and flex plate 42 for rotation with crankshaft 32. Inner race 48 includes an inner stepped recess 100 and an outer stepped recess 102 positioned on either side of a substantially smooth roller contact surface 104. Each of features 100, 102, 104 include substantially cylindrically-shaped surfaces.

Cage 52 may be a molded plastic component or constructed from metal and may be referred to as skeleton 52. Cage 52 includes a first ring 120 and a second ring 122 spaced apart from one another and interconnected by a series of webs 124 axially extending between first ring 120 and second ring 122. Webs 124 are circumferentially spaced apart from one another a predetermined distance corresponding to a desired position of rollers 50. Webs 124 define a plurality of windows 126 within cage 52 to receive rollers 50 as well as multi-spring 54. Cage 52 also includes four radially outwardly extending arms 128 each having an accordion spring 130 coupled thereto.

Each roller 50 is trapped between a concave surface 132 formed on cage 52 and a convexly-shaped distal end 134 of multi-spring 54. A body portion 136 of multi-spring 54 includes a serpentine shape thereby allowing distal end 134 to deflect during clutch operation. Distal end 134 biases roller 50 toward concave surface 132. Roller 50 is positioned in a proximity to cam surface 92 formed in outer race 46.

A cage bump stop 140 is positioned adjacent to a recess 142. During certain modes of operation, rollers 50 may be loaded with a magnitude of force to deflect multi-spring 54. Cage bump stops 140 serve to limit the maximum deflection of multi-spring 54 by limiting the relative movement between rollers 50 and cage 52. Multi-spring 54 is deflected and allowed to enter recess 142 as cage bump stops 140 assure that the multi-spring is not overstressed. During these high roller load events, force is transferred from inner race 48 to rollers 50, through bump stops 140 to cage 52.

Circumferentially extending accordion springs 130 are positioned within pockets 146 to transfer the load from cage 52 to outer race 46.

Figure 2:
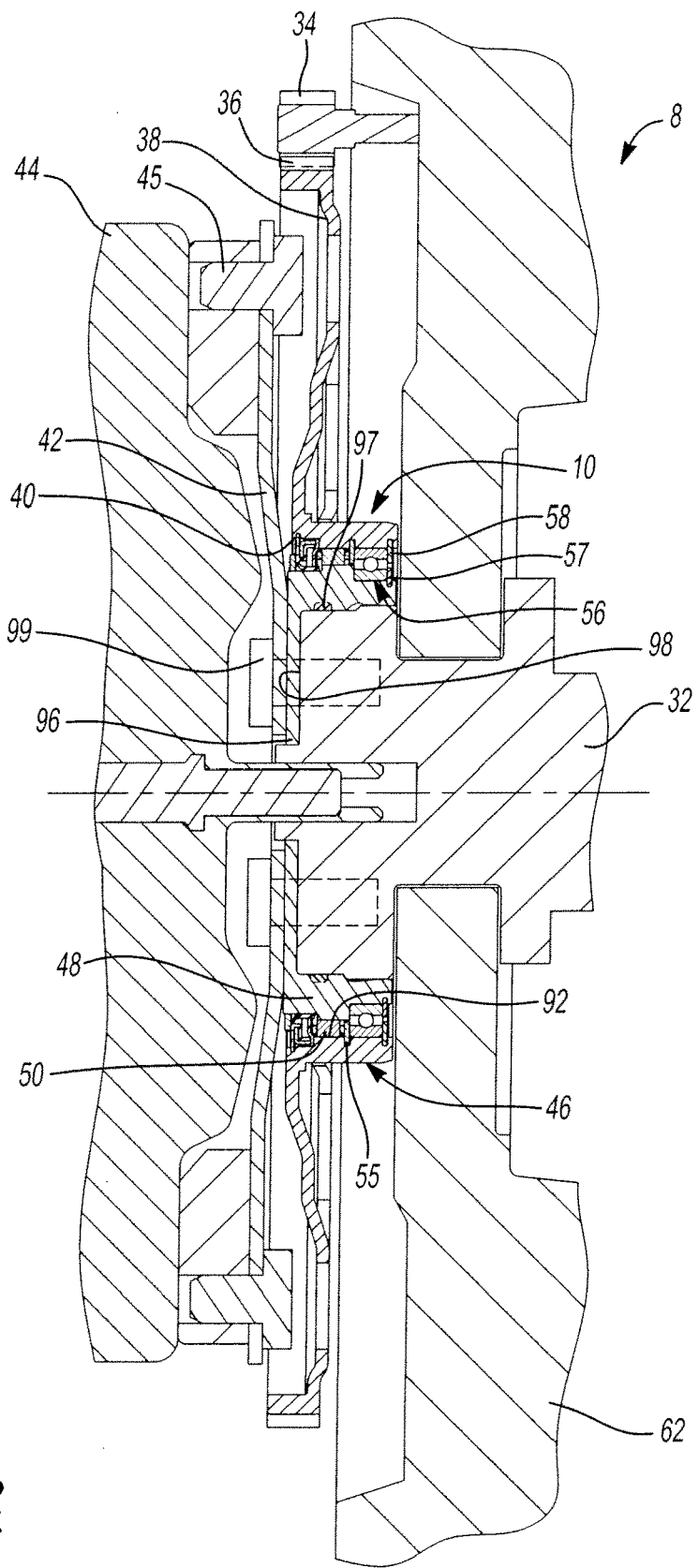
FIG. 2 is a fragmentary cross-sectional view depicting an internal combustion engine starting system including the one-way clutch assembly.
Figure 3:
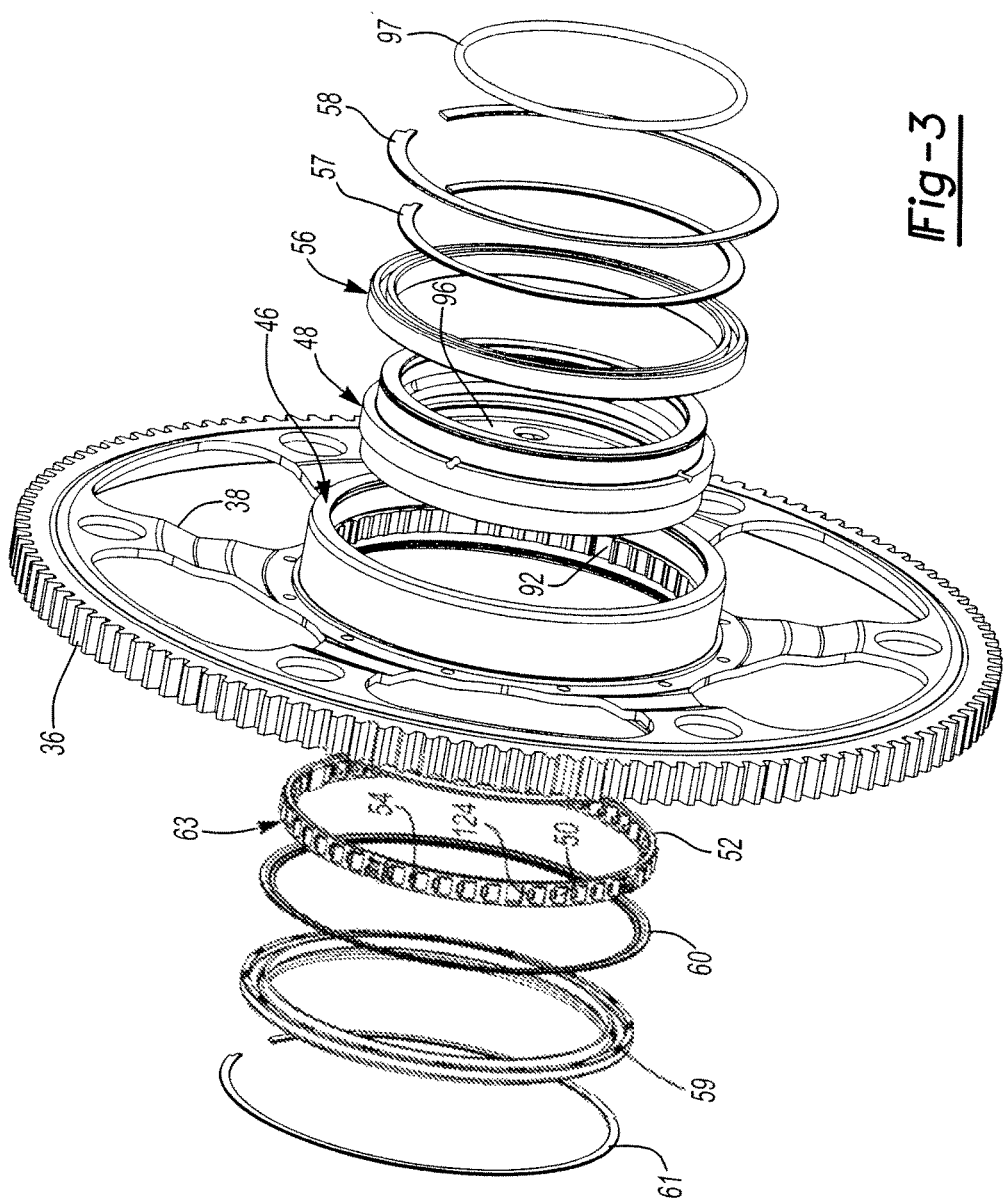
FIG. 3 is an exploded perspective view of a roller clutch, a bearing assembly, and a drive plate associated with the one-way clutch assembly.
Figure 4:
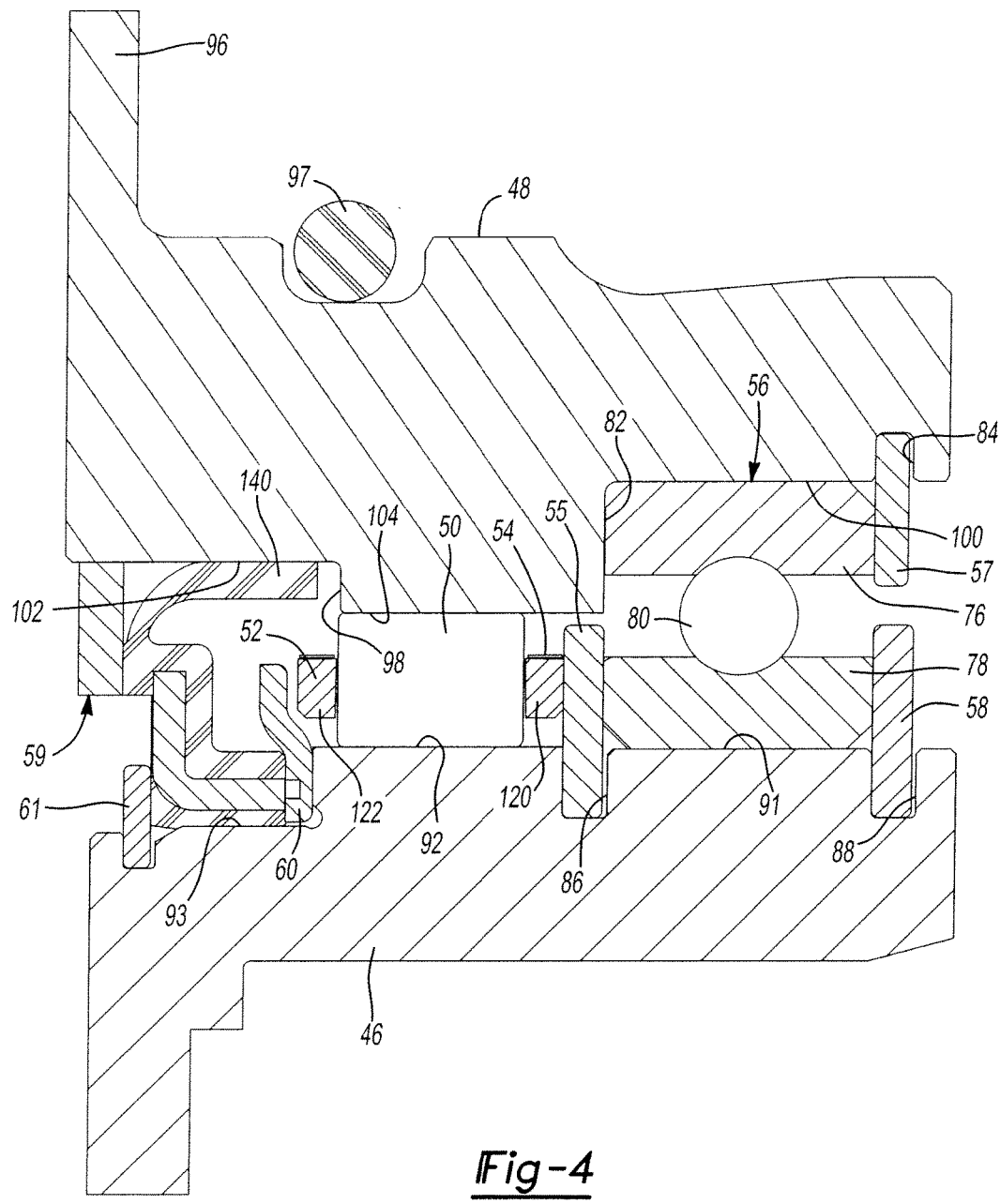
FIG. 4 is a fragmentary sectional view of a portion of the starting system showing the components of the one-way clutch assembly.
Figure 5:
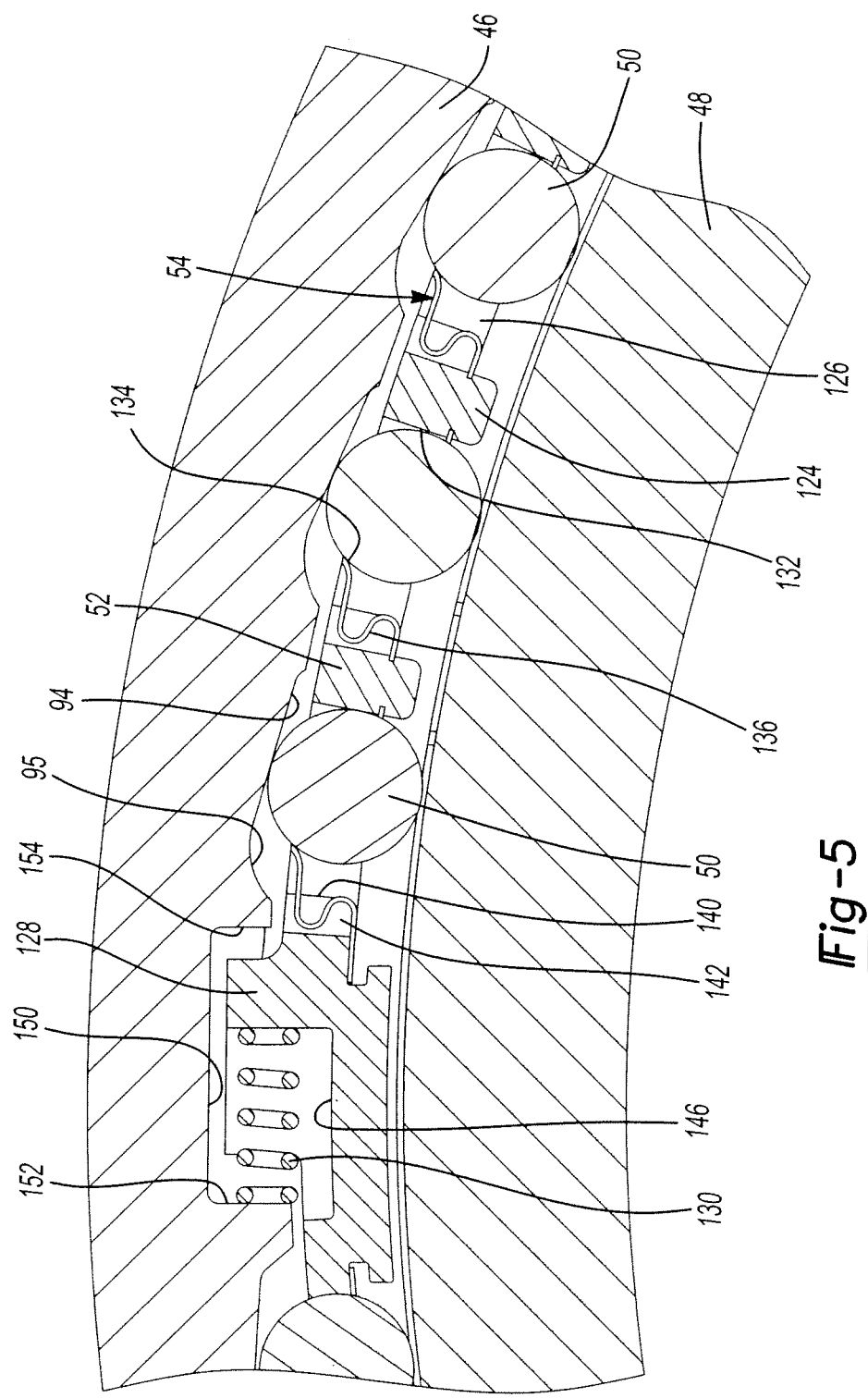
FIG. 5 is a fragmentary sectional view of the roller clutch assembly shown in FIG. 4.

Roller and cage subassembly 63 shown in FIG. 2 may now be positioned between inner race 48 and outer race 46. As shown in FIG. 5, outer race 46 includes four circumferentially spaced apart recesses 150. The terminal ends of arms 128 and accordion springs 130 are positioned within recesses 150. More particularly, one end of accordion spring 130 engages a first sidewall 152 of recess 150. Arm 128 is biased toward a second opposing sidewall 154. When inner race 48 and outer race 46 are at rest, accordion springs 130 rotate cage 52 to engage arms 128 with second sidewalls 154. At this cage position, clutch 10 is in an open or free-wheeling mode where rollers 50 are spaced apart from inner race 48 and are located within deep ends 95. This is also the position of cage 52 when inner race 48 rotates relative to outer race 46 in a first direction such as when internal combustion engine 14 is operating and starter motor 30 is not operating.

Once roller and cage subassembly 63 is positioned between outer race 46 and inner race 48, one axial end of clutch 10 may be enclosed by positioning load plate 55 within ring groove 86. The thickness of load plate 55, the width of ring groove 86, and the position of outer member 78 cooperate with one another such that load plate 55 is fixed for rotation with outer race 46. An inner circumferential edge of load plate 55 is positioned proximate to but clear of inner race 48. A lubricant, such as grease, may be placed in contact with rollers 50, cage 52, multi-spring 54 and load plate 55. The lubricated roller and cage subassembly 63 may be enclosed by installing seal plate 60, seal assembly 59 and outer snap ring 61. Seal plate 60 is fixed for rotation with outer race 46 by pressing seal assembly 59 into second bore 93 and axially loading seal assembly 59 against seal plate 60 via snap ring 61. Seal assembly 59 includes an elastomeric lip 140 biased into engagement with outer stepped recess 102 of inner race 48. Seal plate 60 is positioned in close proximity to but spaced apart from inner race 48 such that frictional losses are minimized and/or eliminated during operation of clutch 10.

To rotatably couple inner race 48 with outer race 46, bearing assembly 56 is axially pressed into its final location. Inner member 76 and outer member 78 are concurrently axially translated until inner member 76 is press-fit to inner stepped recess 100 and outer member 78 is press-fit within first bore 91. Inner member 76 is translated until it engages seat 82. Similarly, outer member 78 is translated until it is further restricted from movement by load plate 55. At this time, inner race 48 and outer race 46 are properly axially aligned and radially spaced apart from one another. Inner bearing retaining ring 57 may be positioned within groove 84 and outer bearing retaining ring 58 may also be positioned within ring groove 88. By positioning and retaining bearing assembly 56 in this manner, inner race 48 is maintained in proper axial position in relation to outer race 46. In addition, bearing assembly 56 is operable to allow vibration and/or oscillation from crankshaft 32 and minimize transmission of such inputs to outer race 46 and drive plate 38.

During vehicle operation, it may be desirable to frequently start and stop internal combustion engine 14. When internal combustion engine 14 is stopped, neither outer race 46 nor inner race 48 are rotating. Accordion springs 130 biasedly engage arms 128 to urge rollers 50 toward deep ends 95 of cam surfaces 92. Clutch 10 is in the open or free-wheeling mode.

During a starting sequence, clutch 10 operates in the locked or torque transferring mode. Starter motor 30 is energized to rotate pinion gear 34. Through the meshed interconnection of pinion gear 34 and ring gear 36, drive plate 38 and outer race 46 are also rotated. At this time, crankshaft 32 and inner race 48 are not rotating. As such, relative rotation between outer race 46 and inner race 48 occurs urging rollers 50 toward shallow ends 94 of cam surfaces 92. Rollers 50 are wedged between cam surfaces 92 and roller contact surface 104 to transfer torque between outer race 46 and inner race 48. Accordion springs 130 are compressed.

Once internal combustion engine 14 has started, starter motor 30 is no longer energized. As internal combustion engine 14 runs, crankshaft 32 and inner race 48 rotate faster than outer race 46 and drive plate 38. Cam surfaces 92 no longer urge rollers 50 toward shallow ends 94. Force is provided from accordion springs 130 to rotate cage 52 and move rollers 50 into the position clear of inner race 48. Relative rotation between rollers 50 and outer race 46 does not occur and energy losses due to friction are avoided.

Figure 6:
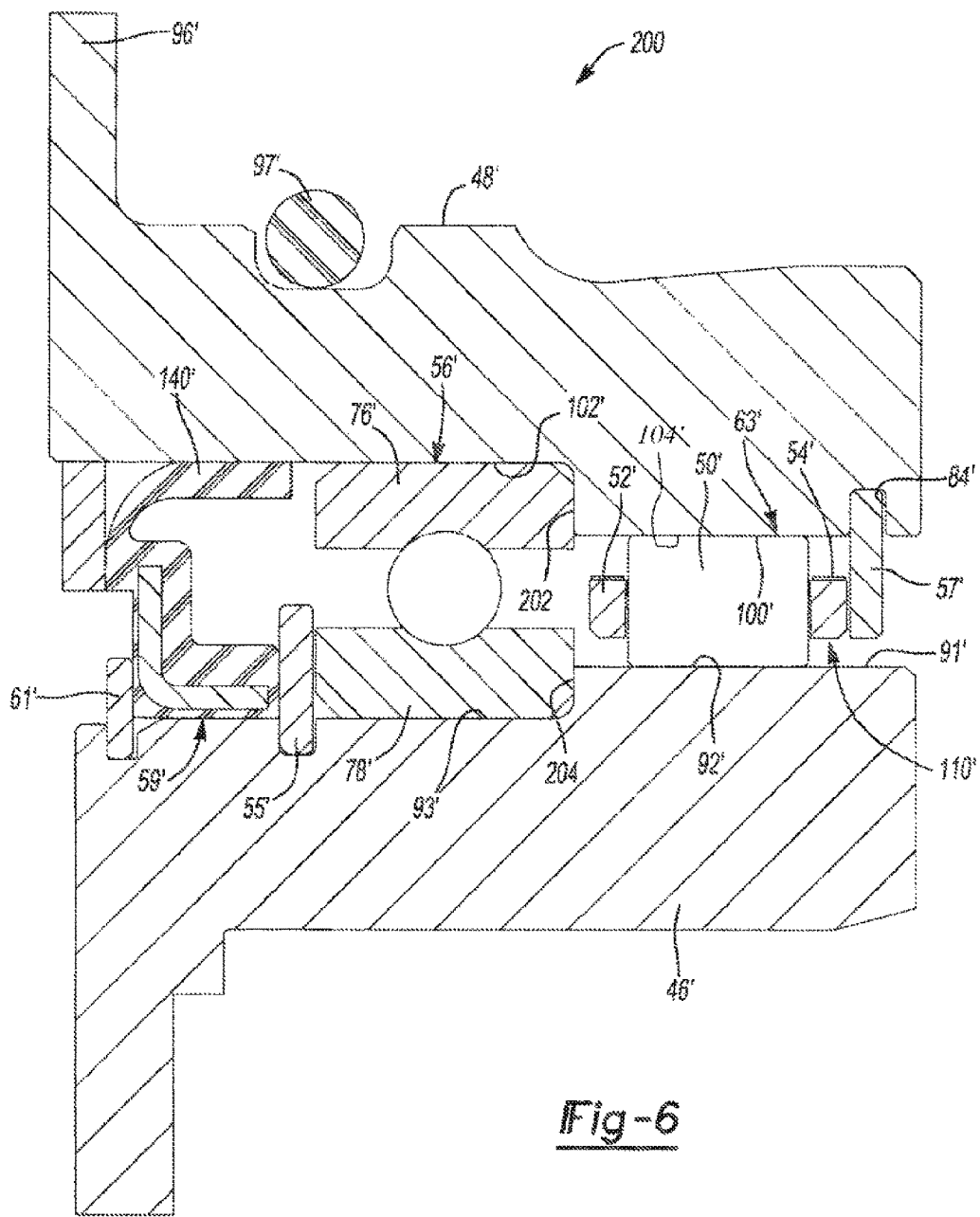
FIG. 6 is a fragmentary sectional view of a portion of an alternate configuration for the one-way clutch assembly.

FIG. 6 depicts a portion of an alternate starting system identified at reference numeral 200. Starting system 200 is substantially similar to torque transfer system 8 previously described. Accordingly, like elements will retain their previously introduced reference numerals including a prime suffix. The primary difference between starting system 200 and torque transfer system 8 lies in the relative axial position of bearing assembly 56' to one-way clutch rollers 50' and seal assembly 59'. In particular, the relative axial positions of bearing assembly 56' and one-way clutch rollers 50' have been swapped such that bearing assembly 56' is centered and axially positioned between seal assembly 59' and the torque transferring elements of the one-way clutch. Inner race 48' is simplified to have an outer stepped recess 102' and an inner stepped recess 100'. Both seal lip 140' of seal assembly 59' and inner member 76' engage the cylindrically shaped surface defined by outer recess 102'. A cylindrical roller contact surface 104' is associated with inner stepped surface 100'. Bearing retaining ring 57' is positioned within ring groove 84' to axially retain roller and cage subassembly 63'.

Outer race 46' includes a first bore 91' and a second bore 93'. Cam surfaces 92' are positioned axially between first bore 91' and second bore 93'. Load plate 55' is engaged by seal 59'. These elements are captured by snap ring 61'. Inner member 76' is axially displaced within stepped recess 102' until it engages a seat 202 formed in inner race 48'. Outer member 78' is axially displaced until it engages a seat 204 formed on outer race 46'. Bearing assembly 56' cooperates with seats 202, 204 and load plate 55' to maintain proper axial alignment and radial spacing between inner race 48' and outer race 46'.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A starting system for a vehicle including an internal combustion engine having a crankshaft rotatably supported within an engine block, the starting system comprising:
   a starter motor;
   a pinion gear driven by the starter motor;
   a drive plate having a set of teeth in constant meshed engagement with the pinion gear;

a one-way clutch assembly adapted to drivingly interconnect the drive plate and the crankshaft, the clutch assembly including an inner race adapted to be fixed for rotation with the crankshaft, an outer race fixed for rotation with the drive plate, and a plurality of rollers positioned radially therebetween, one of the inner and outer races having circumferentially spaced apart cam surfaces, the clutch assembly also including a cage for positioning the rollers in circumferentially spaced apart alignment with the cam surfaces and a roller bearing assembly positioned axially offset from the one-way clutch rollers to rotatably support the outer race on the inner race;

a seal engaging an inner surface of the outer race and an outer surface of the inner race, the seal being positioned axially outboard of the one-way clutch rollers;

wherein the rollers, the roller bearing assembly, the cage, and the seal are positioned along substantially the same radius with respect to a rotary axis of the crankshaft; and a cage retainer plate engaging a surface of the outer race and the seal, and a retaining ring coupled to the outer race to maintain the position of the seal and the cage retaining plate.

2. The starting system of claim 1, wherein the cam surfaces are formed on the outer race, and wherein the seal includes an outer diameter larger than a diameter defined by the cam surfaces.

3. The starting system of claim 2, wherein the seal includes an inner diameter smaller than a diameter defined by a roller contact surface on the inner race.

4. The starting system of claim 1, wherein the bearing assembly includes an inner member fixed for rotation with the inner race, an outer member fixed for rotation with the outer race and a plurality of rolling elements therebetween.

5. The starting system of claim 4, further including an inner bearing retaining ring coupled to the inner race to maintain the axial position of the inner member relative to the inner race, and an outer bearing retaining ring coupled to the outer race to maintain the axial position of the outer member relative to the outer race.

6. The starting system of claim 1, wherein the one-way clutch rollers are axially positioned between the bearing assembly and the seal.

7. The starting system of claim 1, further including a spring acting on the cage and the outer race to engage the clutch rollers with the cam surfaces formed on one of the inner race and the outer race and with a contact surface on the other one of the outer race and the inner race to place the clutch in a torque transferring mode.

8. The starting system of claim 1, wherein the roller bearing assembly is axially positioned between the seal and the clutch rollers.

9. The starting system of claim 8, wherein the roller bearing assembly and the clutch rollers are concentrically aligned.

10. The starting system of claim 9, wherein the roller bearing assembly includes rolling elements positioned at substantially the same radius as the clutch rollers.

11. A starting system for a vehicle including an internal combustion engine having a rotatably crankshaft, comprising:

a starter motor driving a pinion gear;

a ring gear in contact meshed engagement with the pinion gear;

a drive plate coupled for rotation with the ring gear;

a torque transfer unit for selectively drivingly connecting the crankshaft for rotation with the drive plate, the torque transfer unit including a one-way overrunning roller clutch, a seal assembly and a bearing assembly, the roller clutch includes an inner race fixed for rotation with the crankshaft, an outer race fixed for rotation with the drive plate, and a plurality of clutch rollers each positioned radially between a cylindrical roller contact surface formed on one of the inner and outer races and a corresponding cam surface formed on the other one of the inner and outer races, the seal assembly configured to sealingly engage an inner surface portion of the outer race and an outer surface portion of the inner race and is positioned axially outboard of the bearing assembly and the roller clutch, the bearing assembly configured to support the outer race for rotation relative to the inner race and is positioned to be axially offset from the roller clutch; and wherein the bearing assembly includes an inner member fixed for rotation with inner race, an outer member fixed for rotation with the outer race, and rolling elements disposed therebetween, wherein a first ring axially positions the roller clutch, a second ring axially positions the bearing assembly, and a third ring axially positions the seal assembly.

12. The starting system of claim 11, wherein the bearing assembly is axially positioned between the seal assembly and the roller clutch.

13. The starting system of claim 11, wherein the roller clutch is axially positioned between the seal assembly and the first ring.

14. A starting system for a vehicle including an internal combustion engine having a crankshaft rotatably supported within an engine block, the starting system comprising:

a starter motor;

a pinion gear driven by the starter motor;

a drive plate having a set of teeth in constant meshed engagement with the pinion gear;

a one-way clutch assembly adapted to drivingly interconnect the drive plate and the crankshaft, the clutch assembly including an inner race adapted to be fixed for rotation with the crankshaft, an outer race fixed for rotation with the drive plate, and a plurality of rollers positioned radially therebetween, one of the inner and outer races having circumferentially spaced apart cam surfaces, the clutch assembly also including a cage for positioning the rollers in circumferentially spaced apart alignment with the cam surfaces, and a roller bearing assembly positioned axially offset from the one-way clutch rollers to rotatably support the outer race on the inner race;

wherein the bearing assembly includes an inner member fixed for rotation with the inner race, an outer member fixed for rotation with the outer race, and a plurality of rolling elements therebetween; and an inner bearing retaining ring coupled to the inner race to maintain the axial position of the inner member relative to the inner race, and an outer bearing retaining ring coupled to the outer race to maintain the axial position of the outer member relative to the outer race.

15. A starting system for a vehicle including an internal combustion engine having a crankshaft rotatably supported within an engine block, the starting system comprising:

a starter motor;

a pinion gear driven by the starter motor;

a drive plate having a set of teeth in constant meshed engagement with the pinion gear;

a one-way clutch assembly adapted to drivingly interconnect the drive plate and the crankshaft, the clutch assembly including an inner race adapted to be fixed for rotation with the crankshaft, an outer race fixed for rotation with the drive plate, and a plurality of rollers positioned radially therebetween, one of the inner and outer races having circumferentially spaced apart cam surfaces, the clutch assembly also including a cage for positioning the rollers in circumferentially spaced apart alignment with the cam surfaces, and a roller bearing assembly positioned axially offset from the one-way clutch rollers to rotatably support the outer race on the inner race;

a seal engaging an inner surface of the outer race and an outer surface of the inner race, the seal being positioned axially outboard of the one-way clutch rollers; and wherein the one-way clutch rollers are axially positioned between the bearing assembly and the seal.

\* \* \* \* \*